US012712594B2

(12) United States Patent
Pandey

(10) Patent No.: US 12,712,594 B2
(45) Date of Patent: Aug. 18, 2026

(54) APPARATUS AND METHOD FOR CANCELLATION OF RF INTERFERENCE IN A WIRED DATA COMMUNICATION LINK

(71) Applicant: HUAWEI TECHNOLOGIES CO., LTD., Shenzhen (CN)

(72) Inventor: Sujan Pandey, Leuven (BE)

(73) Assignee: Huawei Technologies Co., Ltd., Shenzhen (CN)

(*) Notice: Subject to any disclaimer, the term of this patent is extended or adjusted under 35 U.S.C. 154(b) by 344 days.

(21) Appl. No.: 18/493,528

(22) Filed: Oct. 24, 2023

(65) Prior Publication Data

US 2024/0063846 A1 Feb. 22, 2024

Related U.S. Application Data

(63) Continuation of application No. PCT/EP2021/060801, filed on Apr. 26, 2021.

(51) Int. Cl.
*H04B 3/32* (2006.01)
*H04B 1/04* (2006.01)

(52) U.S. Cl.
CPC ............. *H04B 3/32* (2013.01); *H04B 1/0475* (2013.01)

(58) Field of Classification Search
CPC ................................ H04B 3/32; H04B 1/0475
See application file for complete search history.

(56) References Cited

U.S. PATENT DOCUMENTS 5,539,774 A * 7/1996 Nobakht ........... H04L 25/03267 375/232
5,732,112 A * 3/1998 Langberg .......... H04L 25/03057 375/349
8,315,301 B1 * 11/2012 He .................... H04L 25/03057 375/233
8,861,663 B1 10/2014 Sedarat et al.
9,214,185 B1 12/2015 Song et al.
9,780,815 B2 10/2017 Pandey
2002/0126778 A1 9/2002 Ojard et al.
2004/0091036 A1 * 5/2004 Balasubramonian ........................ H03H 21/0012 375/232
2006/0215775 A1 9/2006 Lin et al.
(Continued)

FOREIGN PATENT DOCUMENTS

CN 111756392 A 10/2020

*Primary Examiner* — Junpeng Chen
(74) *Attorney, Agent, or Firm* — Leydig, Voit & Mayer, Ltd.

(57) ABSTRACT

An apparatus and method are provided for cancellation of RF interference coupling into a wired data communication link. The apparatus comprises: an input configured to provide an input signal, the input signal forming a digital representation of a signal received via the wired data communication link; an adaptive feed forward digital filter configured to filter the input signal in order to provide a feed forward filtered input signal; an adaptive feedback digital filter configured to filter a superposition signal in order to provide a feedback filtered output signal, the superposition signal representing an addition of the feed forward filtered input signal and the feedback filtered output signal; and an adjuster, configured to adjust the adaptive feed forward digital filter and the adaptive feedback digital filter based on an error signal, the error signal representing a difference between the input signal and the superposition signal.

20 Claims, 8 Drawing Sheets

(56) References Cited

U.S. PATENT DOCUMENTS

| | | | | |
|---|---|---|---|---|
| 2010/0046599 | A1* | 2/2010 | Kim | H04L 25/03057 375/233 |
| 2012/0014416 | A1* | 1/2012 | Dabiri | H03H 21/0021 375/144 |
| 2014/0314246 | A1* | 10/2014 | Hellman | G10K 11/17817 381/71.11 |
| 2016/0359646 | A1* | 12/2016 | Iqbal | H04B 7/2621 |
| 2018/0183629 | A1* | 6/2018 | Pandey | H04B 1/38 |
| 2021/0226825 | A1* | 7/2021 | Su | H04L 25/03146 |

* cited by examiner

100
PHY
110
111
PHY
110
111
130
Narrow band interference
131
EM Field
131
PHY
120
121

200
201
ADC
202
210
Adaptive Feed Forward Filter
220
221
Adaptive Feedback Filter
230
231
240
241
e(n)
223
222
Coefficient Adaptive Engine
250
FFE
265
261
DFE
263
262
264
260

400
430
Counter
431
440
Compute Frequency
441
450
LPF
451
Preset
Reset
421
420
Zero crossing detector
410
1-Tap adaptive correlator
412
413
411
201
ADC
202
210
250
Coefficient Adaptive Engine
223
e(n)
241
240
Adaptive Feed Forward Filter
220
221
222
231
Adaptive Feedback Filter
230
260
FFE
265
261
263
DFE
262
264

500
Phase Lock Loop (DPLL)
510
511
1-Tap adaptive correlator
410
411
412
413
ADC
201
202
210
Adaptive Feed Forward Filter
220
221
222
223
Coefficient Adaptive Engine
250
Preset
e(n)
240
241
Adaptive Feedback Filter
230
231
FFE
265
DFE
263
261
262
264
260

800a
801
802
dBm
Freq. (MHz)
800b
Voltage
#samples

APPARATUS AND METHOD FOR CANCELLATION OF RF INTERFERENCE IN A WIRED DATA COMMUNICATION LINK

CROSS-REFERENCE TO RELATED APPLICATIONS

This application is a continuation of International Application No. PCT/EP2021/060801, filed on Apr. 26, 2021, the disclosure of which is hereby incorporated by reference in its entirety.

TECHNICAL FIELD

Embodiments of the present disclosure relate to an apparatus and a method for cancellation of radio frequency (RF) interference coupling into a wired data communication link. In particular, the disclosure relates to techniques for on-the-fly narrow band interference (NBI) cancellation, e.g. for usage in automotive, industrial and consumer electronics environments.

BACKGROUND

Wired based high speed serial communication PHYs (physical interfaces) 110, 120 exchange data over cable 130 as illustrated in FIG. 1 with a maximum length defined by the corresponding standards. The length of the cable 130 varies from a fraction of meter up to about 100 meters. The cable 130 has a finite coupling attenuation depending on a type and quality of the cable. When these cables are placed in a hostile environment with electromagnetic (EM) field 131, the cable 130 acts as an antenna and picks RF interference from the surroundings. The receiver front-end 111, 121 sees RF interference 131 as a (usable) signal as long as the RF interference 131 falls within the band of operating frequency of the PHY 110, 120. This phenomenon degrades the receiver performance by increasing the bit-error-rate (BER) and that increases the chance of dropping the link. This is a real issue and it is more severe for automotive environment, where a sudden link drop is not allowed due to safety requirements. The RF interference 131 adds an additional burden for PHY complexity since it requires tight specification of analog front-end and digital signal processing blocks.

SUMMARY

It is an object of this disclosure to provide a concept for cancelling or at least reducing the RF interference at the PHYs in order to overcome the above described problems.

In particular, it is an object of this disclosure to provide a concept for detecting and canceling out this RF interference on-the-fly without significantly increasing the PHY complexity and power consumption.

This object is achieved by the features of the independent claims. Further implementation forms are apparent from the dependent claims, the description and the figures.

A basic idea of this disclosure is to detect and cancel this RF interference "on-the-fly", i.e. performing this detection and cancellation while the process that the change affects is still ongoing. RF interference detection can be performed by a time-domain correlator. Cancellation can be based on prediction as well as history. If needed, bootstrapping can be used to enhance faster detection. Different bootstrapping methods are presented in this disclosure, that are: a) FFT based bootstrapping, e.g. by using 32 points FFT which results in a complexity that is 142 times lower than the complexity of a 2048 points FFT that is used for comparison. b) Counter based bootstrapping. c) DPLL (digital phase-lock loop) based bootstrapping.

This novel concept presented in this disclosure provides an efficient algorithm with adaptive feed forward and feedback schemes and a power efficient as well as a silicon area efficient implementation.

Following advantages can be realized by using this novel interference detection and cancellation: Softened requirements for tighter receiver analog front-end specification, improved signal-to-noise ratio (SNR) performance, less complex digital signal processing blocks, maintaining always reliable and robust communication link and low power consumption. Added blocks for interference detection and cancellation are not increasing the PHY complexity and power consumption. Digital signal processing algorithms can be exploited to detect and cancel the interference with less hardware effort.

The concept described in this disclosure can be applied in automotive applications using wired-based serial data communication links, e.g. Ethernet cables such as defined by 1000BASE-T1, 10GBASE-T1, and future 25GBASE-T1. As there is a need of more and more bandwidth for the future autonomous vehicle to reliably transmit sensors data to the central processing unit, techniques according to the disclosure can be advantageously applied to improve efficiency of data transmission.

Apart from automotive, the technology described herein can also be applied in industrial and automation applications as well as consumer electronics.

In order to describe the present disclosure in detail, the following terms, abbreviations and notations will be used:

PHY physical layer device or physical interface
NBI narrow band interference
DPLL digital phase lock(ed) loop
FFT Fast Fourier Transform
EM electro-magnetic (field)
RF radio frequency
BER bit error rate
SNR signal-to-noise ratio
FFE feed forward equalizer
DFE decision feedback equalizer
FIR finite impulse response (filter)
ADC analog-to-digital converter
LPF low pass filter
PAM pulse amplitude modulation
VCO voltage-controlled oscillator
BER bit error rate According to a first aspect, the disclosure relates to an apparatus for cancellation of radio frequency interference coupling into a wired data communication link, the apparatus comprising: an input configured to provide an input signal, the input signal forming a digital representation of a signal received via the wired data communication link; an adaptive feed forward digital filter configured to filter the input signal in order to provide a feed forward filtered input signal; an adaptive feedback digital filter configured to filter a superposition signal in order to provide a feedback filtered output signal, the superposition signal representing an addition of the feed forward filtered input signal and the feedback filtered output signal; and an adjuster, configured to adjust the adaptive feed forward digital filter and the adaptive feedback digital filter based on an error signal, the error signal representing a difference between the input signal and the superposition signal.

Such apparatus can advantageously detect and cancel out RF interference on-the-fly without significantly increasing the PHY complexity and power consumption. The "on-the-fly" detection and cancellation of RF interference has the technical advantage that this detection and cancellation can be performed while the process that the change affects, e.g. receiving sensor data, is still ongoing. There is no need for any interruption of data transmission.

In an exemplary implementation of the apparatus, the adjuster is configured to adjust the adaptive feed forward digital filter and the adaptive feedback digital filter based on a bootstrapping configuration of the feed forward digital filter and the feedback digital filter.

The bootstrapping configuration of the feed forward digital filter and the feedback digital filter is an initial configuration of the filter taps of both filters in order to improve convergence of the adaptation.

However, this initial configuration is continuously updated in order to increase convergence not only during startup but also in the case of time-variant channel.

In an exemplary implementation of the apparatus, the bootstrapping configuration of the feed forward digital filter and the feedback digital filter is based on a signal characteristic of the input signal.

This provides the advantage that applying the bootstrapping configuration may result in a faster detection of the RF interference. Different bootstrapping methods can be used as described in the following.

In an exemplary implementation of the apparatus, the bootstrapping configuration of the feed forward digital filter and the feedback digital filter is based on a bandwidth of the input signal.

This provides the advantage that by considering the bandwidth of the input signal, filter taps can be preconfigured based on this bandwidth information. That means, filter taps referring to bandwidth parts present in the input signal may be prioritized over filter taps referring to bandwidth parts that are not present in the input signal.

In an exemplary implementation of the apparatus, the apparatus comprises: a Fast Fourier Transform (FFT) circuit, configured to provide a frequency spectrum of the input signal based on an FFT of the input signal.

This provides the advantage that by using such a FFT, a fast computation of the frequency information of the input signal can be provided resulting in a precise and efficient bootstrapping configuration and thus fast convergence of the adaptation process.

In one example, the FFT circuit may perform a 32-points FFT. Such a 32-points FFT can be efficiently computed with low complexity.

In an exemplary implementation of the apparatus, the apparatus comprises: a detection circuit configured to detect the bandwidth of the input signal based on a comparison of the frequency spectrum of the input signal against a threshold.

This provides the advantage that such a threshold detection can be easily computed at low complexity.

In an exemplary implementation of the apparatus, the apparatus comprises: a correlator, configured to provide an autocorrelation of the input signal, wherein the bootstrapping configuration of the feed forward digital filter and the feedback digital filter is based on the autocorrelation of the input signal.

This provides the advantage that by using such autocorrelation, frequency information of particularly narrow band interference can be efficiently estimated.

The symmetry properties of the autocorrelation function and the fact that a periodic time function also includes a periodic autocorrelation function can be advantageously exploited by the apparatus to provide a suitable bootstrapping configuration.

In one example, the correlator may be an adaptive correlator, in particular a 1-tap adaptive correlator. Such 1-tap adaptive correlator can be implemented at low computational complexity.

In an exemplary implementation of the apparatus, the apparatus comprises: a zero-crossing detector, configured to detect zero crossings of the autocorrelation of the input signal; and a counter configured to determine distances between the zero crossings of the autocorrelation of the input signal, wherein the bootstrapping configuration of the feed forward digital filter and the feedback digital filter is based on the distances between the zero crossings of the autocorrelation of the input signal.

This provides the advantage that these distances between the zero crossings give indication of the one or more frequency components of the input signal, i.e. frequency information of the input signal which can be advantageously exploited to determine the bootstrapping configuration of the filters.

In an exemplary implementation of the apparatus, the apparatus comprises: a frequency conversion table, configured to convert the distances between the zero crossings of the autocorrelation of the input signal to frequency values, wherein the bootstrapping configuration of the feed forward digital filter and the adaptive feedback digital filter is based on the frequency values.

This provides the advantage that by using such frequency conversion table, the distances between the zero crossings of the autocorrelation of the input signal can be easily and efficiently converted to frequency values that can be used to determine the bootstrapping configuration of the feed forward digital filter and the adaptive feedback digital filter.

In an exemplary implementation of the apparatus, the apparatus comprises: a low pass filter, configured to low pass filter the frequency values, wherein the bootstrapping configuration of the feed forward digital filter and the feedback digital filter is based on the low pass filtered frequency values.

This provides the advantage that the low pass filtered frequency components are averaged frequency components of the input signal that are less fluctuating than the non-filtered frequency values. The low pass filter can be adjusted to consider a history of the input signal.

In an exemplary implementation of the apparatus, the apparatus comprises: a digital phase locked loop, configured to determine a frequency of the autocorrelation of the input signal, wherein the bootstrapping configuration of the feed forward digital filter and the feedback digital filter is based on the frequency of the autocorrelation of the input signal.

This provides the advantage that the DPLL can efficiently determine the frequency components of the input signal in order to provide a precise bootstrapping configuration of the feedforward and feedback filters.

In an exemplary implementation of the apparatus, the radio frequency interference is a narrow band interference with respect to a bandwidth of the input signal. For example, the RF interference may be in a range of a few MHz while the bandwidth of the input signal may be in a range of about 400 MHz, e.g. as shown in FIG. 8 described below.

This provides the advantage that the narrow band interference can be easily detected by using frequency estimation methods as described in this disclosure, e.g. by using FFT based estimation, correlation based estimation, counter based estimation or DPLL based estimation as described in this disclosure.

In an exemplary implementation of the apparatus, the apparatus comprises: an equalizer, configured to equalize a channel transfer function of the wired data communication link, the equalizer comprising a feedforward equalizer receiving the superposition signal, a decision feedback equalizer and decision device for providing an estimate of a symbol transmitted via the wired data communication link.

This provides the advantage that such equalizer can efficiently cancel ISI interference and provide a precise estimation of the transmitted symbols as described below with respect to FIG. 2, for example.

In an exemplary implementation of the apparatus, the input signal comprises a pulse-amplitude modulated, PAM, user signal.

This provides the advantage that such apparatus can be efficiently applied in automotive applications where PAM based user signals are utilized.

In an exemplary implementation of the apparatus, the wired data communication link comprises a shielded twisted pair cable.

This provides the advantage that such shielded twisted pair is less sensitive against coupling of RF interference due to the shield. Thus detection and cancellation of the RF interference can be performed at less complexity than for an unshielded cable.

In an exemplary implementation of the apparatus, the wired data communication link comprises an Ethernet cable, in particular an automotive Ethernet cable.

Such an apparatus can be advantageously applied in automotive applications, for example in autonomous vehicle to reliably transmit sensor data to the central processing unit using Ethernet cable as defined, for example, in standards such as 1000BASE-T1, 10GBASE-T1, and future 25GBASE-T1.

Besides, such an apparatus can be advantageously used to improve data communication as defined for example in standards like IEEE 802.3 for wired Ethernet.

Apart from automotive, the apparatus can also be advantageously applied in industrial and automation applications as well as in consumer electronics.

According to a second aspect, the disclosure relates to a method for cancellation of radio frequency interference coupling into a wired data communication link, the method comprising: providing an input signal, the input signal forming a digital representation of a signal received via the wired data communication link; filtering the input signal by an adaptive feed forward digital filter to provide a feed forward filtered input signal; filtering a superposition signal by an adaptive feedback digital filter in order to provide a feedback filtered output signal, the superposition signal representing an addition of the feed forward filtered input signal and the feedback filtered output signal; and adjusting the adaptive feed forward digital filter and the adaptive feedback digital filter based on an error signal, the error signal representing a difference between the input signal and the superposition signal.

Such a method can advantageously detect and cancel out RF interference on-the-fly without significantly increasing the PHY complexity and power consumption. The "on-the-fly" detection and cancellation of RF interference has the technical advantage that this detection and cancellation can be performed while the process that the change affects, e.g. receiving or transmitting sensor data, is still ongoing. There is no need for any interruption of data transmission.

Such a method for cancellation of radio frequency interference coupling into a wired data communication link provides the same advantages as described above for the corresponding apparatus of the first aspect.

According to a third aspect, the disclosure relates to a computer program product including computer executable code or computer executable instructions that, when executed, causes at least one computer to execute the method according to the second aspect.

Such a computer program product may include a non-transient readable storage medium storing program code thereon for use by a processor, the program code comprising instructions for performing the method or the computing blocks as described hereinafter.

The computer program product may run on a computer, e.g. a processor or a controller of a communication system using the wired-base serial data communication link 130 shown in FIG. 1. For example, the computer program product may run on a communication system comprising a processing circuitry, for instance, a processor for processing and generating data, e.g. the program code described above, a transceiver including, for instance, a transmitter, a receiver, e.g. a PHY as shown in FIG. 1, for exchanging data with the other components of the communication system, e.g. the other PHY shown in FIG. 1, and a non-transitory memory for storing data, e.g. the program code described above.

Using such a computer program product improves efficiency of data transmission by cancellation of RF interference.

BRIEF DESCRIPTION OF THE DRAWINGS

Further embodiments of the present disclosure will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The devices and methods described herein may be configured to receive data over wired-based serial data communication link, for example according to IEEE 802.3 for wired Ethernet. The original Ethernet uses coaxial cable as a shared medium, while the newer Ethernet variants use twisted pair and fiber optics links in conjunction with switches. The Ethernet standards comprise several wiring and signaling variants of the OSI physical layer (PHY) in use with Ethernet.

Figure 1:
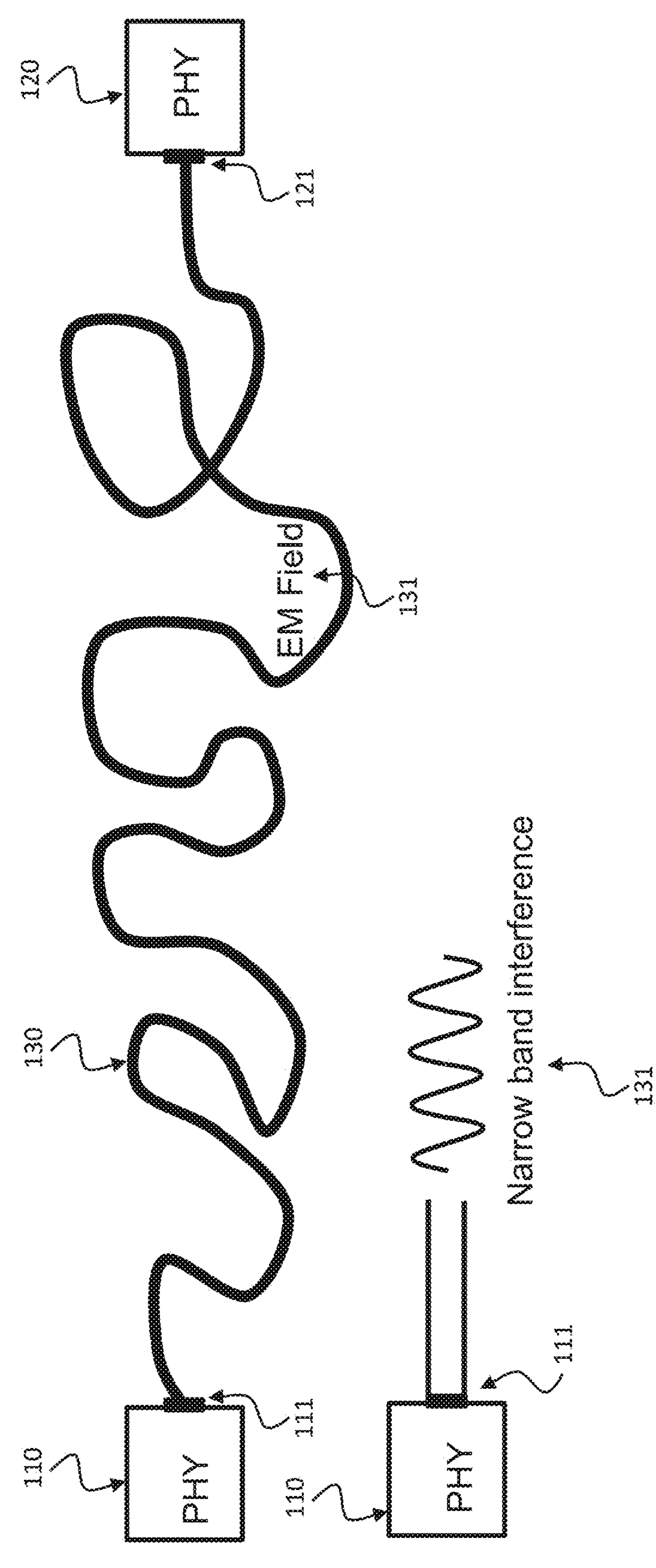
FIG. 1 shows a schematic diagram illustrating a wired-base serial data communication link 130 with EM field coupling RF interference into the data communication link.

FIG. 1 shows a schematic diagram illustrating a wired-based serial data communication link 130 with EM field coupling RF interference into the data communication link. Two wired based high-speed serial communication PHYs 110, 120 exchange data over a wired-based serial data communication link 130. The length of the cable 130 may vary from a fraction of a meter up to about 100 meters. The cable 130 has a finite coupling attenuation depending on a type and quality of the cable. The cable 130 is located in a hostile environment with electromagnetic (EM) field 131. In this environment, the cable 130 may act as an antenna picking RF interference of the EM field. The receiver front-end 111, 121 sees RF interference 131, e.g. in the form of narrow band interference 131 as a (usable) signal as long as the RF interference 131 falls within the band of operating frequency of the PHY 110, 120. This phenomenon degrades the receiver performance by increasing the bit-error-rate (BER) and that increases the chance of dropping the link.

Figure 2:
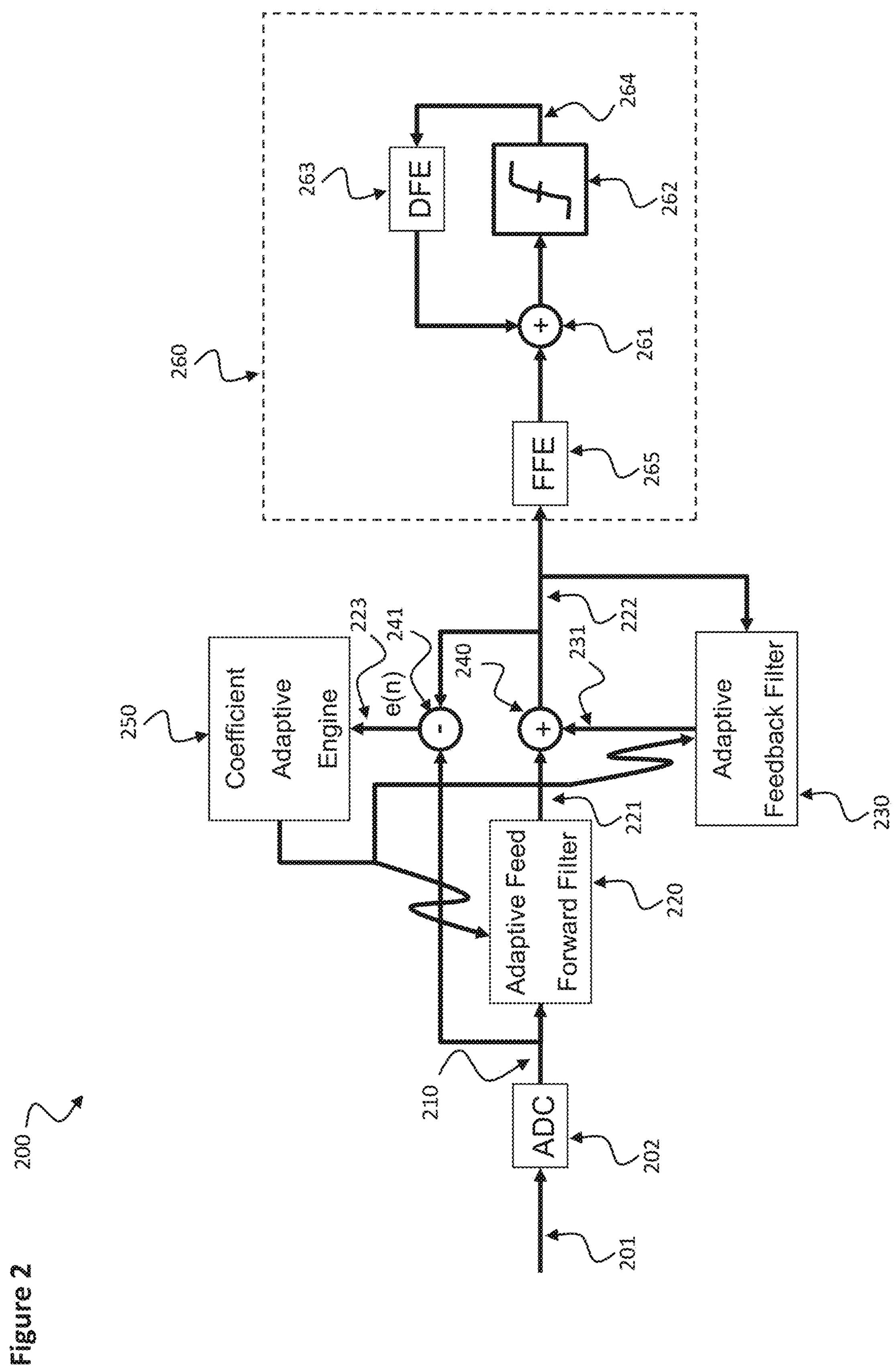
FIG. 2 shows a block diagram of an apparatus 200 for cancellation of RF interference according to a first example.

FIG. 2 shows a block diagram of an apparatus 200 for cancellation of RF interference according to a first example. The RF interference 131 is coupling into a wired data communication link 130 as shown in FIG. 1.

The apparatus 200 comprises an input configured to provide an input signal 210. The input signal 210 forms a digital representation of a signal 201 received via the wired data communication link 130. An analog-to-digital converter 202 can be used to provide the digital input signal 210 based on the analog signal 201 received via the wired data communication link 130.

The apparatus 200 comprises an adaptive feed forward digital filter 220 configured to filter the input signal 210 in order to provide a feed forward filtered input signal 221.

The apparatus 200 comprises an adaptive feedback digital filter 230 configured to filter a superposition signal 222 in order to provide a feedback filtered output signal 231. The superposition signal 222 represents an addition 240 of the feed forward filtered input signal 221 and the feedback filtered output signal 231.

The apparatus 200 comprises an adjuster 250, configured to adjust the adaptive feed forward digital filter 220 and the adaptive feedback digital filter 230 based on an error signal 223. The error signal 223 represents a difference 241 between the input signal 210 and the superposition signal 222.

The adaptive feed forward digital filter 220 and the adaptive feedback digital filter 230 may be implemented, for example, by Finite Impulse Response (FIR) digital filters. Both filters 220, 230 may for example have 1 filter tap. Alternatively, both filters 220, 230 may have 2, 3, 4, 5, 6, 7, 8, 9, 10 or any other number of filter taps, for example. In one example, both filters 220, 230 may have a same number of filter taps. Alternatively, the number of filter taps may be different. For example, the adaptive feedback digital filter 230 may have a larger number of filter taps, e.g. greater than 1, 2, 3, 4, 5, 6, 7, 8, 9, 10 or any other value, than the adaptive feed forward digital filter 220. Alternatively, the adaptive feedback digital filter 230 may have a smaller number of filter taps, e.g. smaller than 1, 2, 3, 4, 5, 6, 7, 8, 9, 10 or any other value, than the adaptive feed forward digital filter 220.

Alternatively, the adaptive feed forward digital filter 220 and the adaptive feedback digital filter 230 may be implemented by Infinite Impulse Response (IIR) digital filters. Alternatively, one of both filters 220, 230 may be implemented by an FIR digital filter while the other one may be implemented by an IIR digital filter. The adaptive feed forward digital filter 220 and the adaptive feedback digital filter 230 may be implemented on a processor or controller, e.g. together with the coefficient adaptive engine 250, by hardware, firmware and/or software.

The adjuster 250 may be implemented by a coefficient adaptive engine, e.g. a processor or a controller configured to implement an adaptive algorithm. The adaptive algorithm may be a gradient algorithm such as a least squares algorithm, e.g. an LMS (Least Mean Squares) algorithm or an RLS (recursive least squares) algorithm.

The adjuster 250 may be configured to adjust the adaptive feed forward digital filter 220 and the adaptive feedback digital filter 230 based on a bootstrapping configuration of the feed forward digital filter 220 and the feedback digital filter 230.

The bootstrapping configuration of the feed forward digital filter 220 and the feedback digital filter 230 is an initial configuration of the filter taps of both filters in order to improve convergence of the adaptation.

However, this initial configuration may be continuously updated in order to increase convergence not only during startup but also in the case of time-variant channel.

The bootstrapping configuration of the feed forward digital filter 220 and the feedback digital filter 230 may be based on a signal characteristic of the input signal 210, e.g. based on a bandwidth of the input signal 210.

The radio frequency interference 131 may be a narrow band interference with respect to a bandwidth of the input signal 210. In some example, the narrow band interference may comprise a single frequency.

The apparatus 200 may comprise an equalizer 260, configured to equalize a channel transfer function of the wired data communication link 130. The equalizer 260 may comprise a feedforward equalizer 265 receiving the superposition signal 222, a decision feedback equalizer 263 and decision device 262 for providing an estimate of a symbol 264 transmitted via the wired data communication link 130.

The equalizer 260 may be used to reduce the inter-symbol interference and to allow recovery of the transmitted symbols.

The feedforward equalizer 265, e.g. implemented as a linear equalizer, e.g. as an FIR filter, may be placed in series with the channel and may be configured to produce an estimate of the channel inverse transfer function. The feedforward equalizer 265 may comprise a real-valued FIR filter, if the transmitted symbols are real-valued or a complex-valued FIR filter if the symbols are complex-valued, e.g. in the case of a QAM system. Their coefficients may be updated with the Least Mean Squares (LMS) algorithm, for example, or any other suitable gradient algorithm.

The performance of a linear equalizer alone is not very good for channels with very severe amplitude distortion. In fact, since the equalizer reproduces the channel inverse transfer function, to compensate for strong attenuation in certain frequency bands, it may generate strong gains in the same frequency bands. This means that not only the signal is amplified in those frequency bands, but also any noise present is amplified as well. This problem can be solved by using the decision feedback equalizer (DFE) 263. The decision feedback equalizer (DFE) may be implemented as a filter that uses feedback of detected symbols to produce an estimate of the channel output. The DFE 263 is fed with detected symbols 264 provided by the decision device 262 and produces an output which is combined 261 with the output of the feedforward equalizer 265. The combination 261 may be an addition or a subtraction. As in the case of the feedforward equalizer 265 the DFE 263 may comprise a real-valued FIR filter, if the transmitted symbols are real-valued, or a complex-valued FIR filter if the symbols are complex-valued.

Since the DFE 263 may only estimate the post-cursors, it may be used in combination with the feedforward equalizer 265.

During the steady-state operation, the DFE 263 contains an estimate of the impulse response of the channel or of the convolution of the channel with the feedforward equalizer 265. Since the DFE 263 may copy the channel output and the DFE output is combined with the incoming signal, it can compensate for severe amplitude distortion without increasing the noise in the highly distorted frequency bands.

As in the case of the feedforward equalizer 265, DFE coefficients may be updated with a gradient algorithm such as the LMS algorithm. This gradient algorithm may also be implemented by the processor or controller on which the adjuster 250 is implemented.

When both, the feedforward equalizer 265 and the DFE 263 are used, the adaptation algorithm for these both equalizers may be accordingly designed in order to take advantage of the features of the two equalizers 265, 263 and to avoid equalization conflicts.

The input signal 210 may comprise a pulse-amplitude modulated (PAM) user signal.

This PAM user signal is a modulated signal where the message information is encoded in the amplitude of a series of signal pulses. It is an analog pulse modulation scheme in which the amplitudes of a train of carrier pulses are varied according to the sample value of the message signal. Demodulation is performed by detecting the amplitude level of the carrier at every single period.

This PAM user signal may be modulated according to Ethernet communication standard. The PAM user signal may comprise a PAM-3 signal according to 100BASE-T4 or BroadR-Reach Ethernet standard. The PAM user signal may comprise a PAM-5 signal according to 1000BASE-T Gigabit Ethernet. The PAM user signal may comprise a PAM-16 signal according to 10GBASE-T 10 Gigabit Ethernet that uses a Tomlinson-Harashima Precoded (THP) version of pulse-amplitude modulation with 16 discrete levels (PAM-16), encoded in a two-dimensional checkerboard pattern known as DSQ128. The PAM user signal may comprise a PAM-4 signal according to 25 Gigabit Ethernet or some copper variants of 100 Gigabit Ethernet or 200 Gigabit Ethernet.

The apparatus 200 is able to cancel RF interference for all of these input signals and cable types described above.

In one example, the wired data communication link 130 may comprise a shielded twisted pair cable.

In one example, the wired data communication link 130 may comprises an Ethernet cable, in particular an automotive Ethernet cable.

Ethernet is a family of wired computer networking technologies commonly used in local area networks (LAN), metropolitan area networks (MAN) and wide area networks (WAN). It was first standardized in 1983 as IEEE 802.3. Ethernet has since been refined to support higher bit rates, a greater number of nodes, and longer link distances, but retains much backward compatibility.

The apparatus 200 is able to cancel RF interference coupled into all kinds of Ethernet cables described above.

The apparatus 200 shown in FIG. 2 may be based on DSP (Digital Signal Processing) algorithm that may run on the processor or controller implementing the adjuster 250 and the digital filters 220, 230 as described above. As described above, the adaptive feed forward and feedback filters 220, 230 taps may depend on the nature of channel loss and bandwidth. An error signal 223 may be used to identify the coefficient that detects and corrects the RF interference. Thus, the apparatus 220 achieves on-the-fly detection and correction of RF interference.

Figure 3:
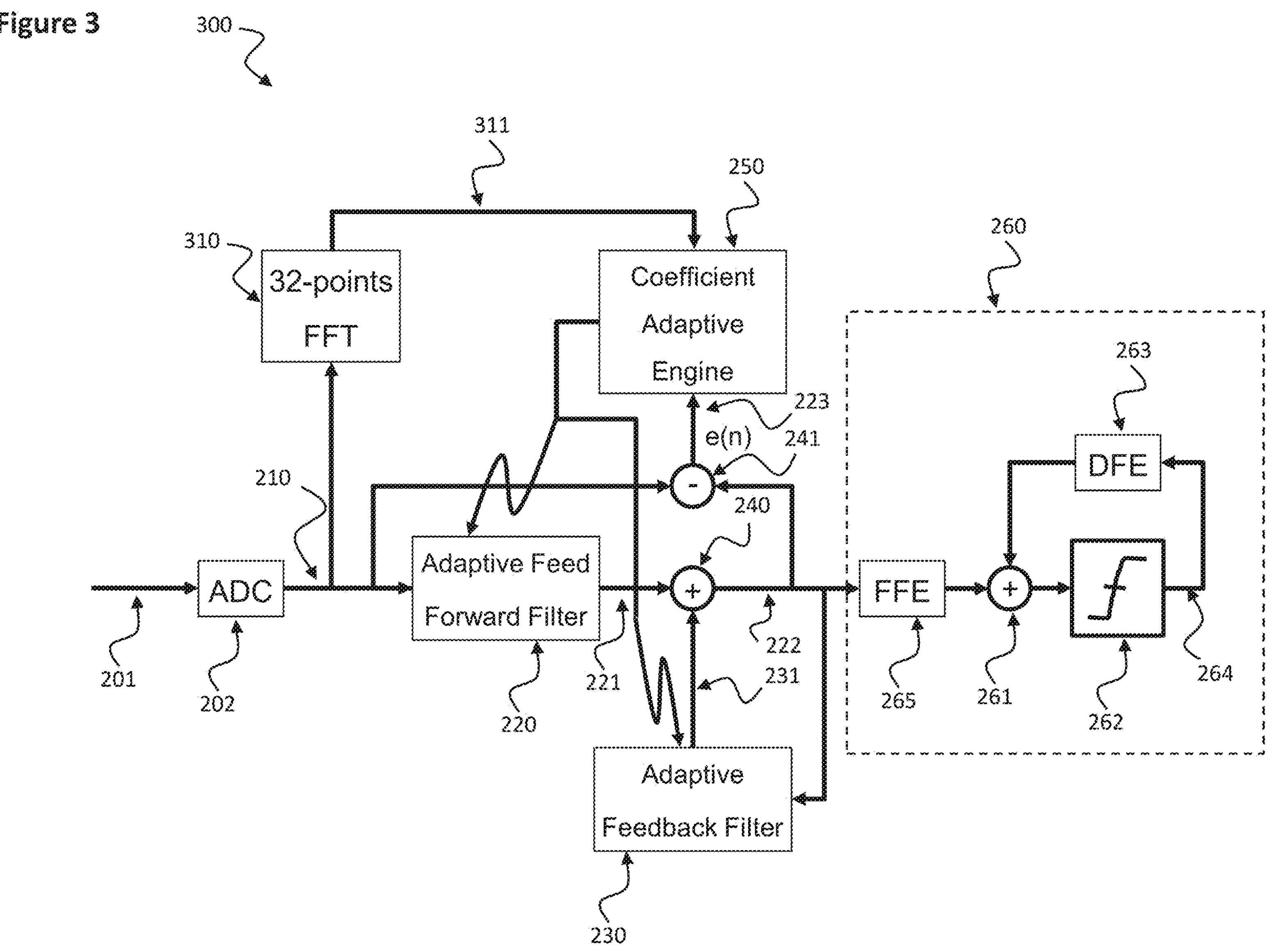
FIG. 3 shows a block diagram of an apparatus 300 for cancellation of RF interference according to a second example.

FIG. 3 shows a block diagram of an apparatus 300 for cancellation of RF interference according to a second example.

The apparatus 300 corresponds to the apparatus 200 described above with respect to FIG. 2 but has some additional functionality as described in the following.

This additional functionality is related to a specific evaluation of the input signal 210 to provide the adjuster 250 with a bootstrapping configuration to increase convergence of the coefficient adaptive engine 250.

The apparatus 300 comprises a Fast Fourier Transform (FFT) circuit 310, configured to provide a frequency spectrum 311 of the input signal 210 based on an FFT of the input signal 210. This frequency spectrum 311 of the input signal 210 may be evaluated by the adjuster 250 in order to increase convergence. For example, the coefficient adaptive engine 250 may use frequency information 311 of the input signal 210 in order to weight the adaptive coefficients based on this frequency information 311. If the input signal 210 is distorted by a narrow band interference 131 as described above with respect to FIG. 1 or even by a single frequency interference, the coefficient adaptive engine 250 can adjust its adaptation method to improve convergence in this frequency range indicated by the frequency information 311. For example, a bootstrapping configuration of the filter coefficients can be applied that corresponds to this narrow band interference 131 or to this single frequency interference. When using such bootstrapping configuration of the filter taps, convergence of the adjuster 250 can be greatly increased.

Such bootstrapping configuration of the filter taps may not only be applied for initial configuration but also for time variant changes of the channel or even time variant changes of the RF interference 131.

In one example, the FFT circuit 310 may perform a 32-points FFT. In other examples, the FFT circuit 310 may perform a 4, 8, 16, 64, 128, 256-points FFT or higher.

The apparatus 300 may further comprise a detection circuit (not shown in FIG. 3) configured to detect the bandwidth of the input signal 210 based on a comparison of the frequency spectrum 311 of the input signal 210 against a threshold. The adjuster 250 may use this bandwidth information detected by the detection circuit to stronger weight filter taps related to this bandwidth of the input signal 210 than filter taps that are not related to this bandwidth of the input signal 210.

The threshold may be an adaptive threshold, e.g. based on a spectral power of the input signal 210. The threshold may be configured to provide sufficient distance to a noise spectrum of the input signal 210 such that only frequencies of the input signal 210 are detected that have a predetermined or configurable distance to the noise spectrum of the input signal.

Depending on the bandwidth of the input signal 210 that may be a base band signal, the performance of RF detection and cancellation may vary. For example, a PHY system with wide bandwidth and depending on the end application might be slow. However, using an apparatus 300 exploiting a bootstrap configuration as described above, can greatly improve the performance of RF detection and cancellation. In particular, the performance can be boosted by bootstrapping using a small "32-points FFT" block 310 as described above. That means, a simple FFT can be used to initialize the coefficients of the filters 220, 230.

Figure 4:
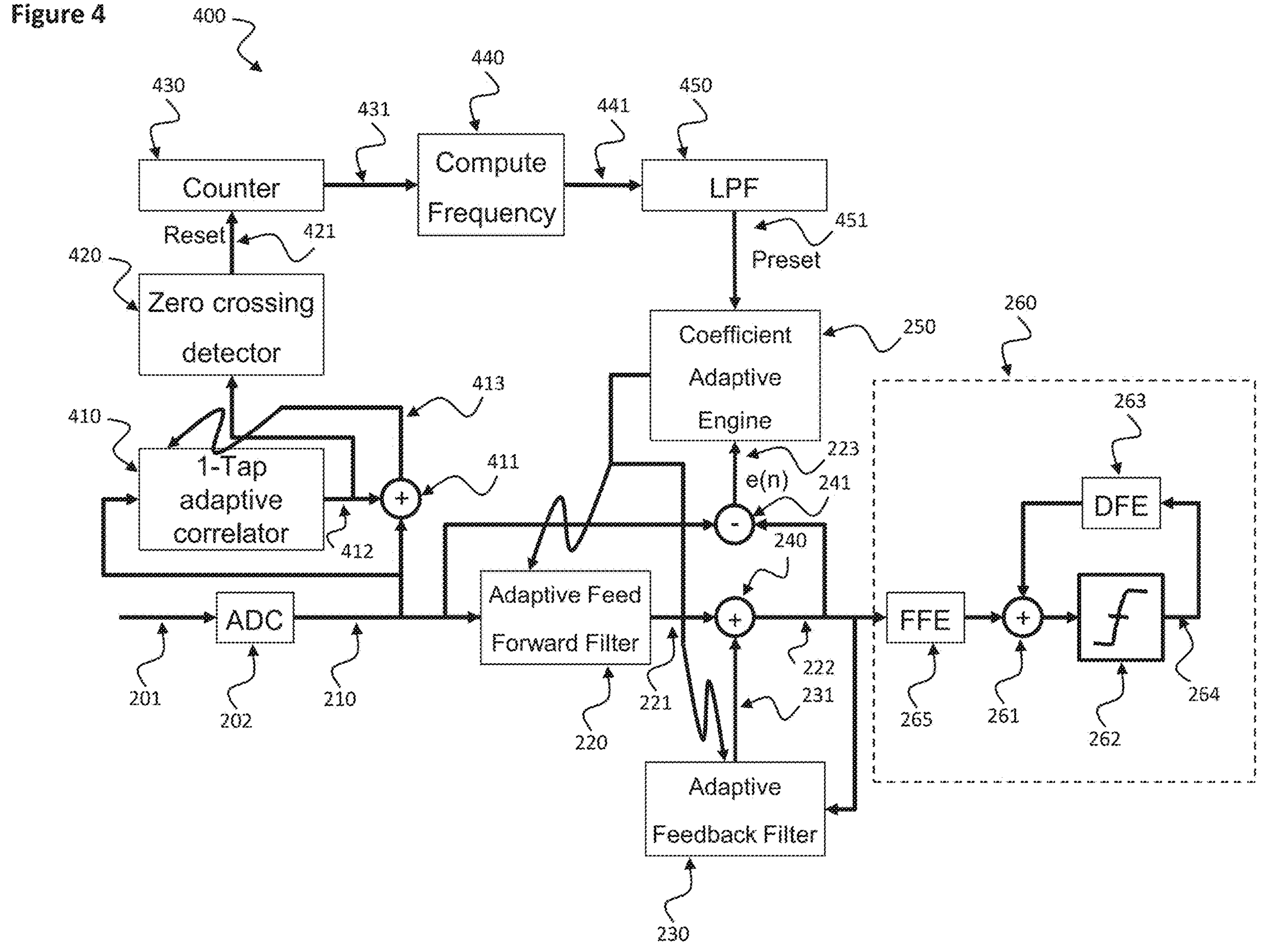
FIG. 4 shows a block diagram of an apparatus 400 for cancellation of RF interference according to a third example.

FIG. 4 shows a block diagram of an apparatus 400 for cancellation of RF interference according to a third example.

The apparatus 400 corresponds to the apparatus 200 described above with respect to FIG. 2 but has some additional functionality as described in the following.

This additional functionality is related to a specific evaluation of the input signal 210 to provide the adjuster 250 with a bootstrapping configuration to increase convergence of the coefficient adaptive engine 250.

Instead of a Fast Fourier Transform (FFT) circuit 310 described above with respect to FIG. 3 for providing frequency information 311 of the input signal 210, the apparatus 400 uses another mechanism to provide this frequency information of the input signal 210 to the adjuster 250, as described in the following.

The apparatus 400 comprises a correlator 410, configured to provide an autocorrelation 412 of the input signal 210. The bootstrapping configuration of the feed forward digital filter 220 and the feedback digital filter 230 may be based on the autocorrelation 412 of the input signal 210. For a narrow band interference 131, as described above with respect to FIG. 1, or even a single frequency interference the autocorrelation 412 of the input signal 210 may depend on the frequency of the input signal. This frequency information can be used by the coefficient adaptive engine 250 to apply a suitable bootstrapping configuration for the filter taps of the feed-forward and feedback filters 220, 230.

For example, the autocorrelation function of an infinitely long sine signal is a cosine signal. The symmetry properties of the autocorrelation function and the fact that a periodic time function also includes a periodic autocorrelation function can be exploited by the apparatus 400 to provide a suitable bootstrapping configuration for the filters 220, 230. It can also be observed that a maximum of the autocorrelation function occurs at position 0. This maximum occurs in every period of the autocorrelation function. Without a shift, the function is most similar to itself. Due to its periodicity, it also agrees with itself again at the beginning of each period. This property of the autocorrelation function for periodic signals, e.g. the input signal 210 comprising the narrow band interference 131 as shown in FIG. 1, can be advantageously exploited to provide frequency information to the coefficient adaptive engine, i.e. the adjuster 250.

The correlator 410 may be implemented as an adaptive correlator, in particular a 1-tap adaptive correlator. Alternatively, the correlator 410 may be implemented as a 2-tap, 3-tap, 4-tap, 5-tap, 6-tap, 7-tap, 8-tap, 9-tap, 10-tap or higher number of taps correlator.

The apparatus 400 may further comprise a zero-crossing detector 420, configured to detect zero crossings 421 of the autocorrelation 412 of the input signal 210. The apparatus 400 may further comprise a counter 430 configured to determine distances 431 between the zero crossings 421 of the autocorrelation 412 of the input signal 210. The bootstrapping configuration of the feed forward digital filter 220 and the feedback digital filter 230 may be based on the distances between the zero crossings 421 of the autocorrelation 412 of the input signal 210. As described above, these distances 431 between the zero crossings 421 give indication of the one or more frequency components of the input signal 120, i.e. frequency information of the input signal 210.

The counter 430 may for example be reset after detection of a respective zero crossing in order to precisely count the distances 431 between two zero crossings 421.

The apparatus 400 may further comprise a frequency conversion table 440, configured to convert the distances 431 between the zero crossings 421 of the autocorrelation 412 of the input signal 210 to frequency values 441. The bootstrapping configuration of the feed forward digital filter 220 and the adaptive feedback digital filter 230 may be based on these frequency values 441.

The frequency conversion table 440 may be preconfigured or adapted based on knowledge of the input signal 210 and/or the narrow band interference 131.

The apparatus 400 may comprise a low pass filter 450, configured to low pass filter the frequency values 441. The bootstrapping configuration of the feed forward digital filter 220 and the feedback digital filter 230 may be based on the low pass filtered frequency values 451. By using the low pass filter 450, the frequency information may be steady without having fluctuations. This results in a more efficient bootstrapping configuration.

In the following an example is described how to compute 440 Frequency 441 From Counter Output 431. The following variables may be used:

Tp: the precision of the counter 430 in seconds;

N: the counter value between two zero crossings.

Time may be determined as Time (T)=Tp*N (in seconds).

Frequency may be determined as 1/Time (in Hertz).

The frequency computation 440 may be implemented by a lookup table with discrete interval. The following time-frequency correspondence may be used as an example:

$$T1<T<=T2\rightarrow F1$$

$$T2<T<=T3\rightarrow F2,$$

where T1<T2<T3.

That means, if time value T is in between T1 and T2, frequency value F1 is computed; and if time value T is in between T2 and T3, frequency value F2 is computed, where T1<T2<T3.

Depending on the bandwidth of the input signal 210 that may be a base band signal, the performance of RF detection and cancellation may vary. For example, a PHY system with wide bandwidth and depending on the end application might be slow. However, using an apparatus 400 exploiting a bootstrap configuration as described above, can greatly improve the performance of RF detection and cancellation. In particular, the performance can be boosted by bootstrapping using a 1-tap correlator with a counter as shown in FIG.

4 and described above. That means, a simple correlator 410 can be used to initialize the coefficients of the filters 220, 230.

Figure 5:
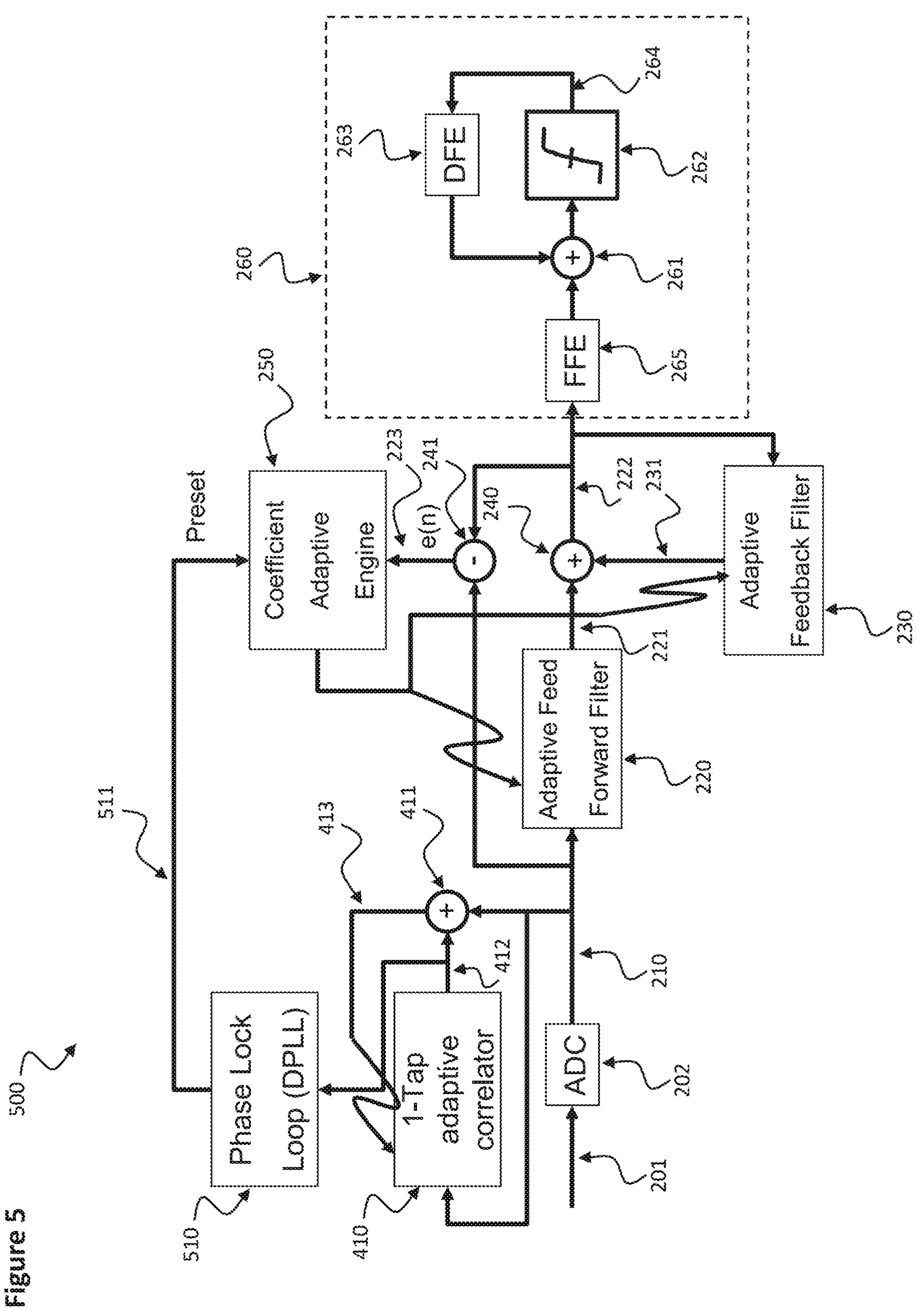
FIG. 5 shows a block diagram of an apparatus 500 for cancellation of RF interference according to a fourth example.

FIG. 5 shows a block diagram of an apparatus 500 for cancellation of RF interference according to a fourth example.

The apparatus 500 corresponds to the apparatus 400 described above with respect to FIG. 4 but has some different functionality for determining the frequency information of the input signal 210 as described in the following.

This additional functionality is related to a specific evaluation of the correlation information 413 determined by the correlator 410 to provide the adjuster 250 with a bootstrapping configuration to increase convergence of the coefficient adaptive engine 250.

Instead of a zero crossing detector 420, counter 430, frequency computation 440 and low pass filter 450 as described above with respect to FIG. 4, a digital phase lock loop (DPLL) 510 is utilized by the apparatus 500 to provide the frequency information 511 of the input signal 210 to the adjuster 250, as described in the following.

The apparatus 500 comprises a digital phase locked loop 510, configured to determine a frequency 511 of the autocorrelation 410 of the input signal 210. The bootstrapping configuration of the feed forward digital filter 220 and the feedback digital filter 230 may be based on the frequency 511 of the autocorrelation 410 of the input signal 210 as determined by the DPLL 510.

The DPLL 510 may be implemented as described below with respect to FIG. 6.

Depending on the bandwidth of the input signal 210 that may be a base band signal, the performance of RF detection and cancellation may vary. For example, a PHY system with wide bandwidth and depending on the end application might be slow. However, using an apparatus 500 exploiting a bootstrap configuration as described above, can greatly improve the performance of RF detection and cancellation. In particular, the performance can be boosted by bootstrapping using a DPLL 510 as shown in FIG. 5 and described above or in FIG. 6. That means, a simple DPLL 510 can be used to initialize the coefficients of the filters 220, 230.

Figure 6:
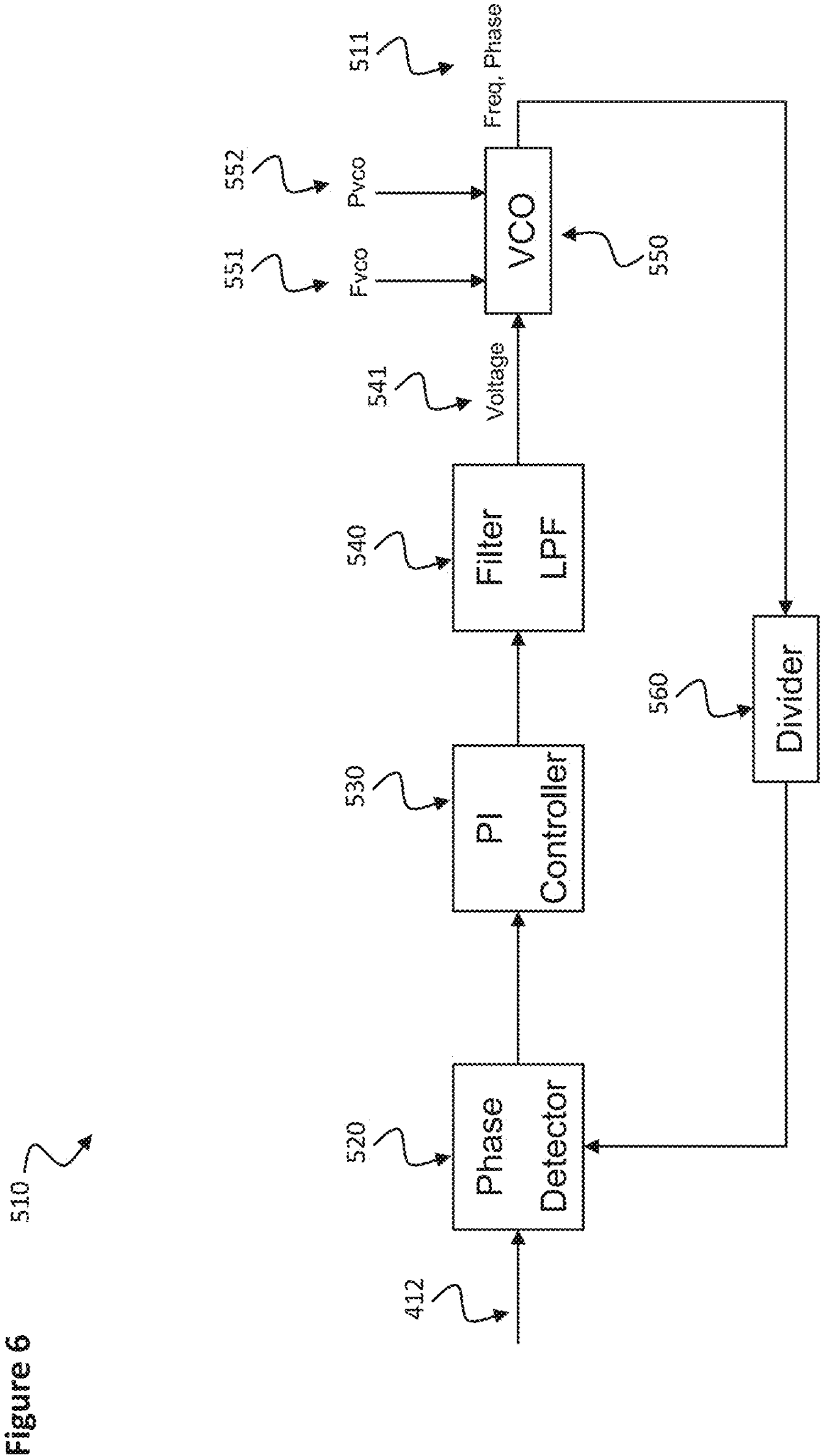
FIG. 6 shows a block diagram of an exemplary digital phase lock loop (DPLL) that may be used in the apparatus 500 according to the fourth example.

FIG. 6 shows a block diagram of an exemplary digital phase lock loop (DPLL) that may be used in the apparatus 500 according to the fourth example.

The DPLL 510 comprises a phase detector 520 receiving the autocorrelation signal 412 of the input signal 210. An output of the phase detector 520 is passed to a PI controller 530.

The PI controller 530 implements a control loop mechanism employing feedback. The PI controller 530 continuously calculates an error value as the difference between a desired setpoint (SP) and a measured process variable (PV) and applies a correction based on proportional and integral terms (denoted P and I, respectively). The term P is proportional to the current value of the SP-PV error. The term I accounts for past values of the SP-PV error and integrates them over time to produce the I term.

An output of the PI controller 530 is passed to the low pass filter 540 that determines a voltage 541. This voltage 541 drives a voltage-controlled oscillator (VCO) 550 which determines frequency and phase information 511 based on a free running oscillator frequency (Fvco) 551 and an initial phase (Pvco) 552. The frequency and phase information 511 is passed through a divider 560 and further provided to the phase detector 520.

The frequency and phase information 511 provided by the DPLL 510 represents information about the frequency components of the input signal 210 and can be advantageously used to provide bootstrapping configuration for the filter taps of the adaptive feedforward filter 220 and the adaptive feedback filter 230, e.g. as described above with respect to FIG. 5.

In the following an example is described how to operate the DPLL 510 and determine the frequency and phase information 511 which comprises Phase and Frequency according to the following relation:

$$\text{Phase} = Pvco + 2 \cdot \pi \cdot \text{V} \cdot Kvco \cdot Ts;$$

$$\text{Frequency} = 2 \cdot \pi \cdot Fvco \cdot t + \text{Phase}.$$

The following variables are used in this example:

Pvco (552): represents the initial phase of VCO (550);

V: represents the phase error;

Kvco: represents the VCO (550) gain constant (Hz/V);

Ts: represents a sample period;

Fvco (551) represents the free running oscillator frequency in Hz;

t: represents the instantaneous time;

Phase: represents the steady state phase output; and

Freq: represents the steady state frequency output.

Figure 7:
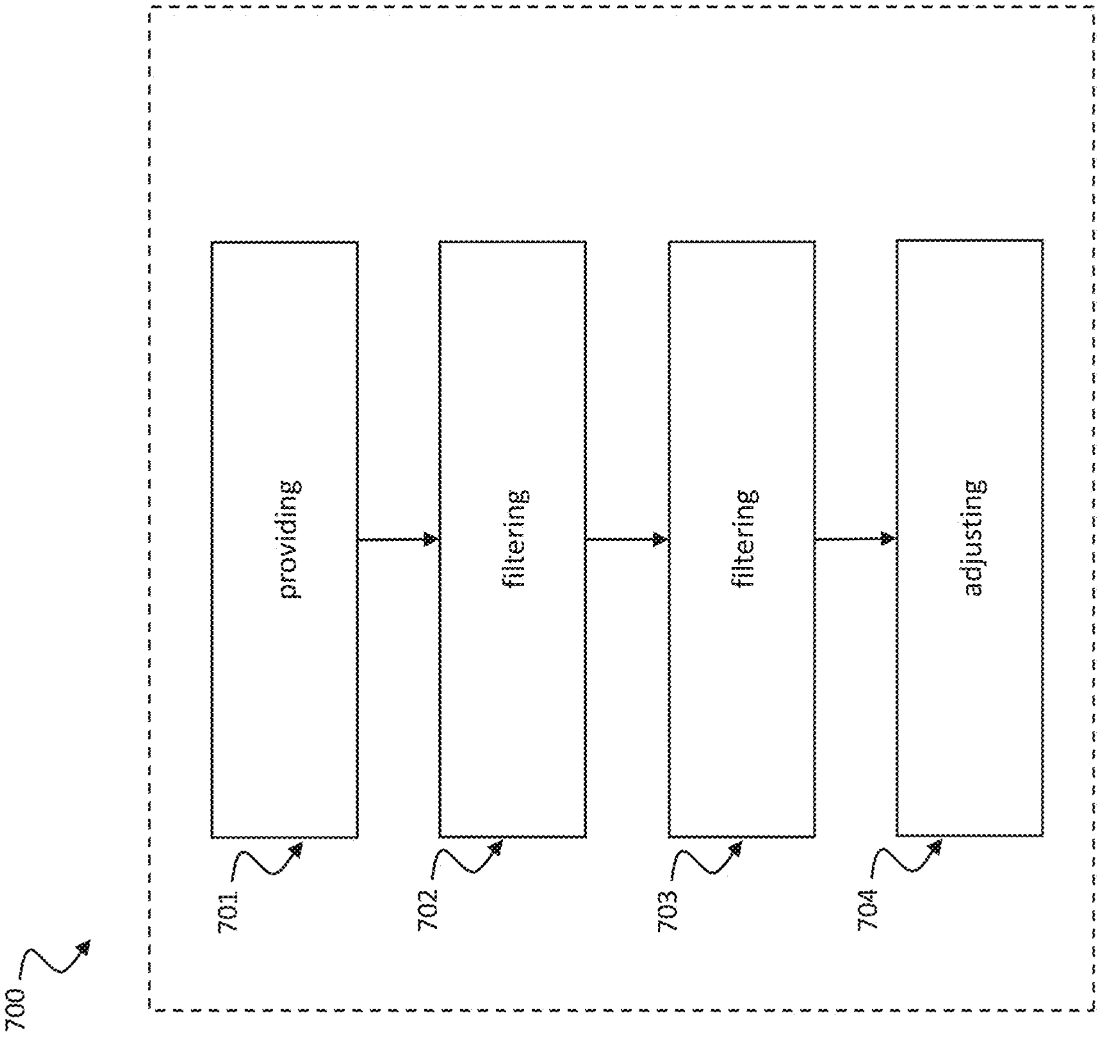
FIG. 7 shows a schematic diagram of a method 700 for cancellation of RF interference according to the disclosure.

FIG. 7 shows a schematic diagram of a method 700 for cancellation of RF interference according to the disclosure.

The method 700 comprises providing 701 an input signal 210, the input signal 210 forming a digital representation of a signal received via the wired data communication link 130, e.g. as described above with respect to FIGS. 2 to 5.

The method 700 comprises filtering 702 the input signal 210 by an adaptive feed forward digital filter 220 to provide a feed forward filtered input signal 221, e.g. as described above with respect to FIGS. 2 to 5.

The method 700 comprises filtering 703 a superposition signal 222 by an adaptive feedback digital filter 230 in order to provide a feedback filtered output signal 231, the superposition signal 222 representing an addition 240 of the feed forward filtered input signal 221 and the feedback filtered output signal 231, e.g. as described above with respect to FIGS. 2 to 5.

The method 700 comprises adjusting 704 the adaptive feed forward digital filter 220 and the adaptive feedback digital filter 230 based on an error signal 223, the error signal 223 representing a difference 241 between the input signal 210 and the superposition signal 222, e.g. as described above with respect to FIGS. 2 to 5.

Figure 8:
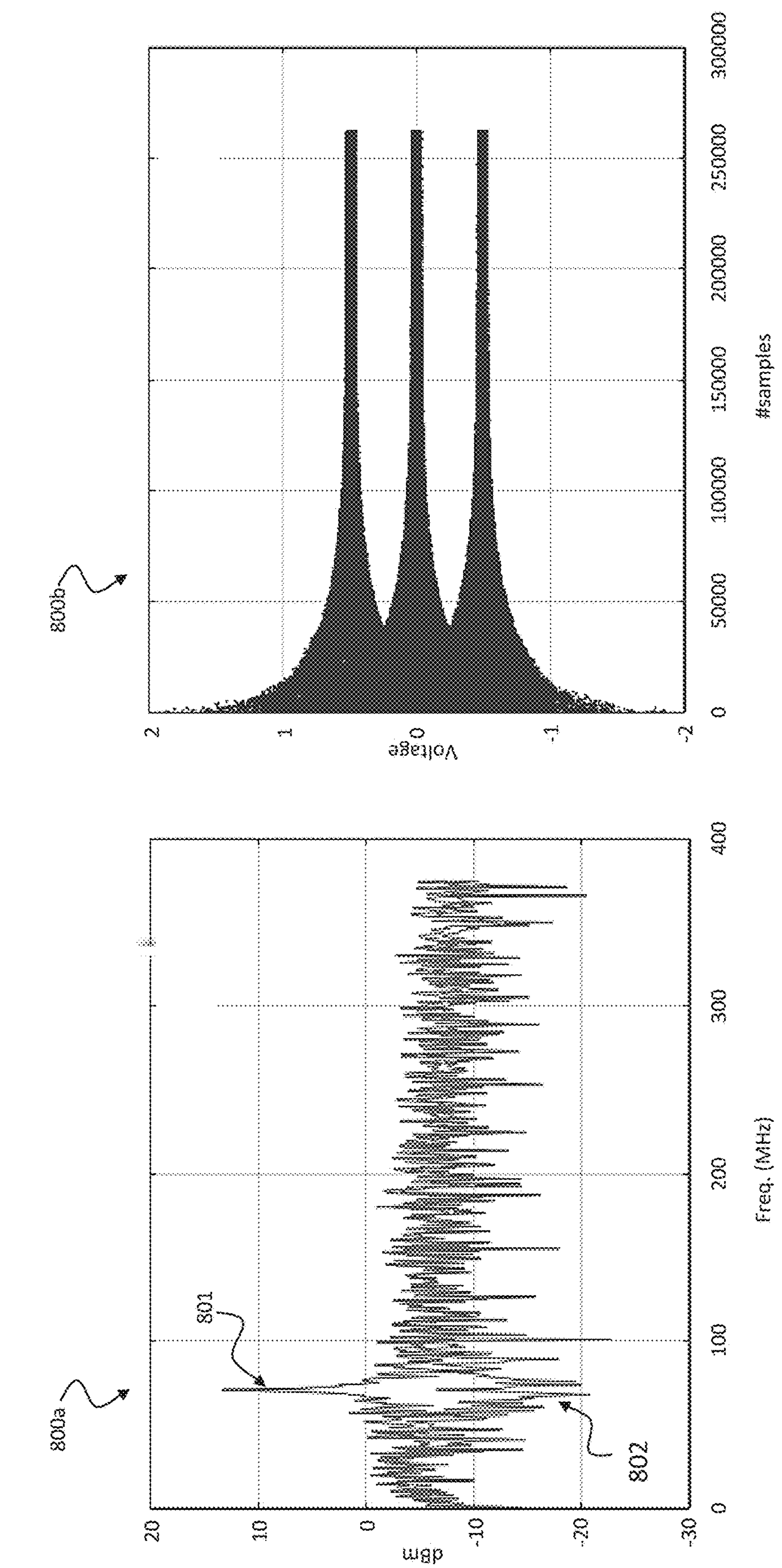
FIG. 8 shows performance diagrams 800*a*, 800*b* of an apparatus for cancellation of RF interference according to the disclosure.

FIG. 8 shows performance diagrams 800*a*, 800*b* of an apparatus for cancellation of RF interference according to the disclosure.

In the left-side diagram 800*a* graph 801 represents the input signal 210 as described above with respect to FIGS. 2 to 7 which is afflicted by narrow band interference 131 as shown in FIG. 1. Graph 802 represents the output signal of the apparatus according to the disclosure, e.g. apparatus 100. This output signal corresponds to the input signal 210 in which the narrow band interference 131 is cancelled.

In this example, a 100 mVpp interference is applied to the input signal 210. The following use case is considered by FIG. 8:

1000BASE-T1 PHY Automotive standard with PAM3;

Higher insertion loss of ~20 dB at Nyquist frequency;

1Vpp transmit voltage and no random noise.

The right-side diagram 800*b* show the eye diagram in voltage per samples. It can be observed that after a specific number of samples, in this example about a number of 40000 samples, the eye diagram clearly shows three symbols that can be easily detected by applying some thresholds. These three symbols correspond to the original symbols of the PAM3 modulation.

The performance diagrams 800*a*, 800*b* thus show the advantages of the techniques described in this disclosure, that are: Detection and correction of RF interference "on-the-fly"; re-adjusting when there is change in frequency and phase as well as low power and low implementation complexity resulting in a smaller silicon area.

Re-adjusting means that frequency estimation can re-adjust when there is a slight change in frequency and phase. There is no need to precompute frequency again, e.g. by using FFT or other frequency estimation as described above.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the present disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. An apparatus for cancellation of radio frequency interference coupling into a wired data communication link, the apparatus comprising:

an input configured to provide an input signal, wherein the input signal forms a digital representation of a signal received via the wired data communication link;

an adaptive feed forward digital filter, configured to filter the input signal in order to provide a feed forward filtered input signal;

an adaptive feedback digital filter, configured to filter a superposition signal in order to provide a feedback filtered output signal, wherein the superposition signal represents an addition of the feed forward filtered input signal and the feedback filtered output signal;

an adjuster, configured to adjust the adaptive feed forward digital filter and the adaptive feedback digital filter based on an error signal, the error signal representing a difference between the input signal and the superposition signal; and a correlator, configured to provide an autocorrelation of the input signal, wherein the adjuster is configured to adjust the adaptive feed forward digital filter and the adaptive feedback digital filter based on a bootstrapping configuration of the adaptive feed forward digital filter and the adaptive feedback digital filter;

wherein the bootstrapping configuration of the adaptive feed forward digital filter and the adaptive feedback digital filter is based on the autocorrelation of the input signal.

2. The apparatus of claim 1, wherein the bootstrapping configuration of the feed forward digital filter and the feedback digital filter is based on a signal characteristic of the input signal.

3. The apparatus of claim 1, wherein the bootstrapping configuration of the feed forward digital filter and the feedback digital filter is based on a bandwidth of the input signal.

4. The apparatus of claim 3, further comprising:

a Fast Fourier Transform (FFT) circuit, configured to provide a frequency spectrum of the input signal based on an FFT of the input signal.

5. The apparatus of claim 4, further comprising:

a detection circuit, configured to detect the bandwidth of the input signal based on a comparison of the frequency spectrum of the input signal against a threshold.

6. The apparatus of claim 1, further comprising:

a zero-crossing detector, configured to detect zero crossings of the autocorrelation of the input signal; and a counter, configured to determine distances between the zero crossings of the autocorrelation of the input signal, wherein the bootstrapping configuration of the feed forward digital filter and the feedback digital filter is based on the distances between the zero crossings of the autocorrelation of the input signal.

7. The apparatus of claim 6, further comprising:

a frequency conversion table, configured to convert the distances between the zero crossings of the autocorrelation of the input signal to frequency values, wherein the bootstrapping configuration of the feed forward digital filter and the adaptive feedback digital filter is based on the frequency values.

8. The apparatus of claim 7, further comprising:

a low pass filter, configured to low pass filter the frequency values, wherein the bootstrapping configuration of the feed forward digital filter and the feedback digital filter is based on the low pass filtered frequency values.

9. The apparatus of claim 1, further comprising:

a digital phase locked loop, configured to determine a frequency of the autocorrelation of the input signal, wherein the bootstrapping configuration of the feed forward digital filter and the feedback digital filter is based on the frequency of the autocorrelation of the input signal.

10. The apparatus of claim 1, wherein the radio frequency interference is a narrow band interference with respect to a bandwidth of the input signal.

11. The apparatus of claim 1, further comprising:

an equalizer, configured to equalize a channel transfer function of the wired data communication link, wherein the equalizer comprises a feedforward equalizer receiving the superposition signal, a decision feedback equalizer and a decision device for providing an estimate of a symbol transmitted via the wired data communication link.

12. The apparatus of claim 1, wherein the input signal comprises a pulse-amplitude modulated user signal.

13. The apparatus of claim 1, wherein the wired data communication link comprises a shielded twisted pair cable.

14. The apparatus of claim 1, wherein the wired data communication link comprises an automotive Ethernet cable.

15. The apparatus of claim 1, wherein the bootstrapping configuration is an initial configuration of filter taps of the adaptive feed forward digital filter and the adaptive feedback digital filter.

16. A method for cancellation of radio frequency interference coupling into a wired data communication link, the method which is applied to an electronic device comprising:

providing an input signal, wherein the input signal forms a digital representation of a signal received via the wired data communication link;

filtering the input signal by an adaptive feed forward digital filter to provide a feed forward filtered input signal;

filtering a superposition signal by an adaptive feedback digital filter in order to provide a feedback filtered output signal, wherein the superposition signal represents an addition of the feed forward filtered input signal and the feedback filtered output signal;

adjusting the adaptive feed forward digital filter and the adaptive feedback digital filter based on an error signal, wherein the error signal represents a difference between the input signal and the superposition signal;

providing an autocorrelation of the input signal, wherein the adaptive feed forward digital filter and the adaptive feedback digital filter are further adjusted based on a bootstrapping configuration of the adaptive feed forward digital filter and the adaptive feedback digital filter; and wherein the bootstrapping configuration of the adaptive feed forward digital filter and the adaptive feedback digital filter is based on the autocorrelation of the input signal.

17. The method of claim 16, wherein the bootstrapping configuration of the adaptive feed forward digital filter and the adaptive feedback digital filter is based on a signal characteristic of the input signal.

18. The method of claim 16, wherein the bootstrapping configuration of the adaptive feed forward digital filter and the adaptive feedback digital filter is based on a bandwidth of the input signal.

19. The method of claim 16, further comprising:

detecting zero crossings of the autocorrelation of the input signal; and determining distances between the zero crossings of the autocorrelation of the input signal, wherein the bootstrapping configuration of the feed forward digital filter and the feedback digital filter is based on the distances between the zero crossings of the autocorrelation of the input signal.

20. The method of claim 19, further comprising:

converting the distances between the zero crossings of the autocorrelation of the input signal to frequency values, wherein the bootstrapping configuration of the feed forward digital filter and the adaptive feedback digital filter is based on the frequency values.

* * * * *